(12) United States Patent
Degroot et al.

(10) Patent No.: US 11,090,916 B2
(45) Date of Patent: Aug. 17, 2021

(54) ELASTIC LAMINATES, METHOD OF MANUFACTURE THEREOF AND ARTICLES COMPRISING THE SAME

(71) Applicants: DOW GLOBAL TECHNOLOGIES LLC, Midland, MI (US); Dow Quimica Mexicana S.A. de C.V., Cuauhtemoc (MX)

(72) Inventors: Jacquelyn A. Degroot, Sugar Land, TX (US); Vivek Kalihari, Missouri City, TX (US); Adriana M. Velasquez, Missouri City, TX (US); Selim Bensason, Rueschlikon (CH); Fabricio Arteaga Larios, Sugar Land, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 699 days.

(21) Appl. No.: 15/747,913

(22) PCT Filed: Jul. 26, 2016

(86) PCT No.: PCT/US2016/044033
§ 371 (c)(1),
(2) Date: Jan. 26, 2018

(87) PCT Pub. No.: WO2017/019680
PCT Pub. Date: Feb. 2, 2017

(65) Prior Publication Data
US 2018/0222171 A1  Aug. 9, 2018

Related U.S. Application Data

(60) Provisional application No. 62/197,282, filed on Jul. 27, 2015.

(51) Int. Cl.
*B32B 37/00* (2006.01)
*B32B 7/05* (2019.01)
(Continued)

(52) U.S. Cl.
CPC .......... *B32B 37/0084* (2013.01); *B32B 5/022* (2013.01); *B32B 5/26* (2013.01);
(Continued)

(58) Field of Classification Search
CPC ............ B32B 27/12; B32B 2262/0253; B32B 2307/54; B32B 2310/028; B32B 27/32;
(Continued)

(56) References Cited

U.S. PATENT DOCUMENTS 4,041,203 A  8/1977 Brock et al.
4,107,364 A  8/1978 Sisson
(Continued)

FOREIGN PATENT DOCUMENTS

WO  9808680 A1  3/1998
WO  2004020174 A1  3/2004
(Continued)

OTHER PUBLICATIONS https://en.wikipedia.org/wiki/Polypropylene (Year: XX).*
(Continued)

*Primary Examiner* — Arti Singh-Pandey
(74) *Attorney, Agent, or Firm* — Cantor Colburn LLP

(57) ABSTRACT

Disclosed herein is a multilayer laminate comprising a film comprising an ethylene-based elastomer; a first non-woven layer in contact with a first surface of the film; and a second non-woven layer in contact with a second surface of the film; wherein the second surface of the film is opposedly disposed to the first surface of the film; wherein at least one of the first non-woven layer or the second non-woven layer comprises a non-woven web; and wherein the non-woven web is formed from a bicomponent fiber having a first component comprising an polyethylene-based polymer and a second component comprising a polymer having a melting point that is higher than the polyethylene-based polymer, wherein (Continued)

at least a portion of a surface of the bicomponent fiber comprises the first component.

11 Claims, 6 Drawing Sheets

(51) Int. Cl.
    *B32B 5/02*     (2006.01)
    *B32B 5/26*     (2006.01)
    *B32B 27/08*     (2006.01)
    *B32B 27/12*     (2006.01)
    *B32B 27/32*     (2006.01)
    *B32B 38/00*     (2006.01)
    *B32B 27/06*     (2006.01)
    *B32B 39/00*     (2006.01)

(52) U.S. Cl.
    CPC ............... *B32B 7/05* (2019.01); *B32B 27/06* (2013.01); *B32B 27/08* (2013.01); *B32B 27/12* (2013.01); *B32B 27/32* (2013.01); *B32B 37/0053* (2013.01); *B32B 38/1875* (2013.01); *B32B 39/00* (2013.01); *B32B 2262/0253* (2013.01); *B32B 2262/12* (2013.01); *B32B 2305/20* (2013.01); *B32B 2307/00* (2013.01); *B32B 2307/51* (2013.01); *B32B 2307/54* (2013.01); *B32B 2310/028* (2013.01); *B32B 2323/00* (2013.01); *B32B 2555/02* (2013.01)

(58) Field of Classification Search
    CPC ....... B32B 5/022; B32B 7/05; B32B 2262/12; B32B 2305/20; B32B 2307/00; B32B 2307/51; B32B 2323/00; B32B 2555/02; B32B 27/06; B32B 27/08; B32B 37/0053; B32B 37/0084; B32B 38/1875; B32B 39/00; B32B 5/26; D06M 17/00; D06M 17/06; A61F 13/51
    See application file for complete search history.

(56) References Cited

U.S. PATENT DOCUMENTS

| | | | |
|---|---|---|---|
| 4,116,892 A | 9/1978 | Schwarz |
| 4,153,751 A | 5/1979 | Schwarz |
| 4,209,463 A | 6/1980 | Maender et al. |
| 4,368,565 A | 1/1983 | Schwarz |
| 4,525,407 A | 6/1985 | Ness |
| 4,599,392 A | 7/1986 | McKinney et al. |
| 4,720,415 A | 1/1988 | Vander Wielen et al. |
| 4,762,890 A | 8/1988 | Strait et al. |
| 4,927,888 A | 5/1990 | Strait et al. |
| 4,950,541 A | 8/1990 | Tabor et al. |
| 5,143,679 A | 9/1992 | Weber et al. |
| 5,145,727 A | 9/1992 | Potts et al. |
| 5,156,793 A | 10/1992 | Buell et al. |
| 5,167,897 A | 12/1992 | Weber et al. |
| 5,169,706 A | 12/1992 | Collier, IV et al. |
| 5,178,931 A | 1/1993 | Perkins et al. |
| 5,188,885 A | 2/1993 | Timmons et al. |
| 5,540,976 A | 7/1996 | Shawver et al. |
| 5,783,638 A | 7/1998 | Lai et al. |
| 5,861,074 A | 1/1999 | Wu |
| 6,286,145 B1 | 9/2001 | Welchel et al. |
| 7,498,262 B2 | 3/2009 | Patel et al. |
| 7,608,668 B2 | 10/2009 | Li Pi Shan et al. |
| 7,723,246 B2 | 5/2010 | Baldauf et al. |
| 7,741,397 B2 | 6/2010 | Liang et al. |
| 7,915,192 B2 | 3/2011 | Arriola et al. |
| 7,955,457 B2 | 6/2011 | Middlesworth et al. |
| 8,337,190 B2 | 12/2012 | Curro et al. |
| 8,748,693 B2 | 6/2014 | Westwood |
| 2003/0088228 A1 | 5/2003 | Desai et al. |
| 2004/0121690 A1 | 6/2004 | Mleziva et al. |
| 2004/0222553 A1 | 11/2004 | Desai et al. |
| 2006/0003656 A1 | 1/2006 | Morman |
| 2006/0057924 A1 | 3/2006 | Cheng et al. |
| 2007/0249253 A1 | 10/2007 | Angeli et al. |
| 2008/0241476 A1 | 10/2008 | Olguin |
| 2009/0264844 A1 | 10/2009 | Autran et al. |
| 2010/0215923 A1 | 8/2010 | Frost |
| 2012/0046400 A1 | 2/2012 | Kaarto et al. |
| 2014/0255658 A1 | 9/2014 | Muslet et al. |
| 2014/0257219 A1 | 9/2014 | Neton et al. |
| 2015/0164705 A1 | 6/2015 | Thomas et al. |
| 2015/0308039 A1 | 10/2015 | Bonaboglia et al. |

FOREIGN PATENT DOCUMENTS

| | | |
|---|---|---|
| WO | 2005090425 A1 | 9/2005 |
| WO | 2005090426 A1 | 9/2005 |
| WO | 2005090427 A2 | 9/2005 |

OTHER PUBLICATIONS https://en.wikipedia.org/wiki/Polyethylene (Year: XX).*
International Search Report for International Application No. PCT/US2016/044033, International Filing Date Jul. 26, 2016, dated Oct. 6, 2016, 5 pages.
Markovich et al.; "Development of Gel Permeation Chromatography-Fourier Transform Infrared Spectroscopy for Characterization of Ethylene Based Polyolefin Copolymers"; Polymeric Materials Science and Engineering, vol. 65, 1991, pp. 98-100.
U.S. Appl. No. 60/566,2938, filed Mar. 17, 2005.
U.S. Appl. No. 60/662,937, filed Mar. 17, 2005.
U.S. Appl. No. 60/662,939, filed Mar. 17, 2005.
Written Opinion for International Application No. PCT/US2016/044033, International Filing Date Jul. 26, 2016, dated Oct. 6, 2016, 5 pages.

* cited by examiner

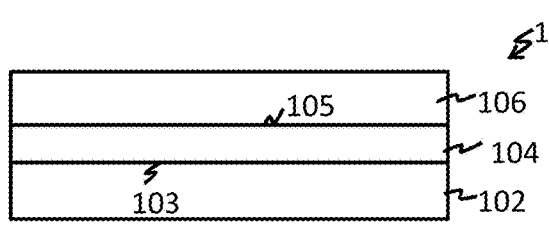
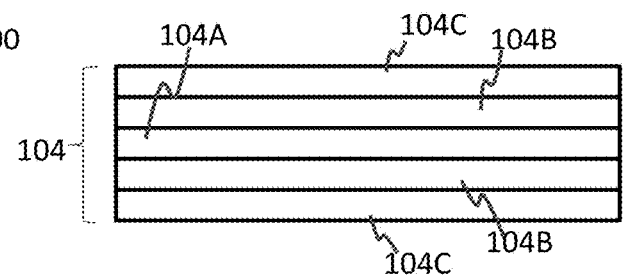
FIG. 1A
FIG. 1B

ELASTIC LAMINATES, METHOD OF MANUFACTURE THEREOF AND ARTICLES COMPRISING THE SAME

CROSS REFERENCE TO RELATED APPLICATIONS

This application is a National Stage application of PCT/US2016/044033, filed Jul. 26, 2016, which claims the benefit of U.S. Provisional Application No. 62/197,282, filed Jul. 27, 2015, both of which are incorporated by reference in their entirety herein.

BACKGROUND

This disclosure relates to elastic laminates, methods of manufacture thereof and to articles comprising the same.

Elastic laminates such as those used in hygiene absorbent products including diapers, training pants, and adult incontinence products may contain a non-woven substrate as the non-woven or non-wovens and an elastic core. The non-woven non-woven(s) provides a cloth-like touch with the desirable tensile strength and mechanical properties suitable for the manufacture of hygiene absorbent products. The elastic core provides desirable "stretch" and "recovery" to provide the end-user with a comfortable fit and to help prevent leakage from the product. The non-woven is often manufactured from polypropylene because of its spinnability, draw down, heat resistance and superior strength and. Certain lower crystallinity polyethylenes exhibit superior elasticity and recovery and are a good potential choice for elastic core. But their application in elastic laminates is limited because of difficulties in bonding polyethylene films and polypropylene fibers. These difficulties are manifested in lower laminate peel strengths, reduced laminate tensile strengths, and poor abrasion performance.

In addition, during the bonding of the layers to form the laminate, holes are often produced, which can be undesirable and detrimental to the laminate performance. It is therefore desirable to produce elastic laminates that have good adhesion between the various layers, exhibit good tensile strength and abrasion resistance in use, that do not have holes, and that display a good elastic performance.

SUMMARY

Disclosed herein is a multilayer laminate comprising a film comprising an ethylene-based elastomer; a first non-woven layer in contact with a first surface of the film; and a second non-woven layer in contact with a second surface of the film; wherein the second surface of the film is opposedly disposed to the first surface of the film; wherein at least one of the first non-woven layer or the second non-woven layer comprises a non-woven web; and wherein the non-woven web is formed from a bicomponent fiber having a first component comprising an polyethylene-based polymer and a second component comprising a polymer having a melting point that is higher than the polyethylene-based polymer, wherein at least a portion of a surface of the bicomponent fiber comprises the first component; wherein the film and at least one of the first non-woven layer or the second non-woven layer are joined at a plurality of ultrasonic bond sites.

Disclosed herein too is a method for manufacturing a multilayer laminate, the method comprising intermittently bonding together at a plurality of bond sites a film, a first non-woven layer and a second non-woven layer using ultrasonic energy to form a multilayer laminate; wherein the first non-woven layer is in contact with a first surface of the film and the second non-woven layer is in contact with a second surface of the film; wherein the second surface of the film is opposedly disposed to the first surface of the film; wherein the film comprises an ethylene-based elastomer; wherein at least one of the first non-woven layer or the second non-woven layer comprises a non-woven web; wherein the non-woven web is formed from a bicomponent fiber having a first component comprising an polyethylene-based polymer and a second component comprising a polymer having a melting point that is higher than the polyethylene-based polymer, wherein at least a portion of a surface of the bicomponent fiber comprises the first component.

BRIEF DESCRIPTION OF THE FIGURES

FIG. 1A depicts an exemplary embodiment of the multi-layered laminate;

FIG. 1B depicts and exemplary embodiment of the film that comprises a core layer; at least one inner layer and at least one outer layer;

DETAILED DESCRIPTION

Figure 2:
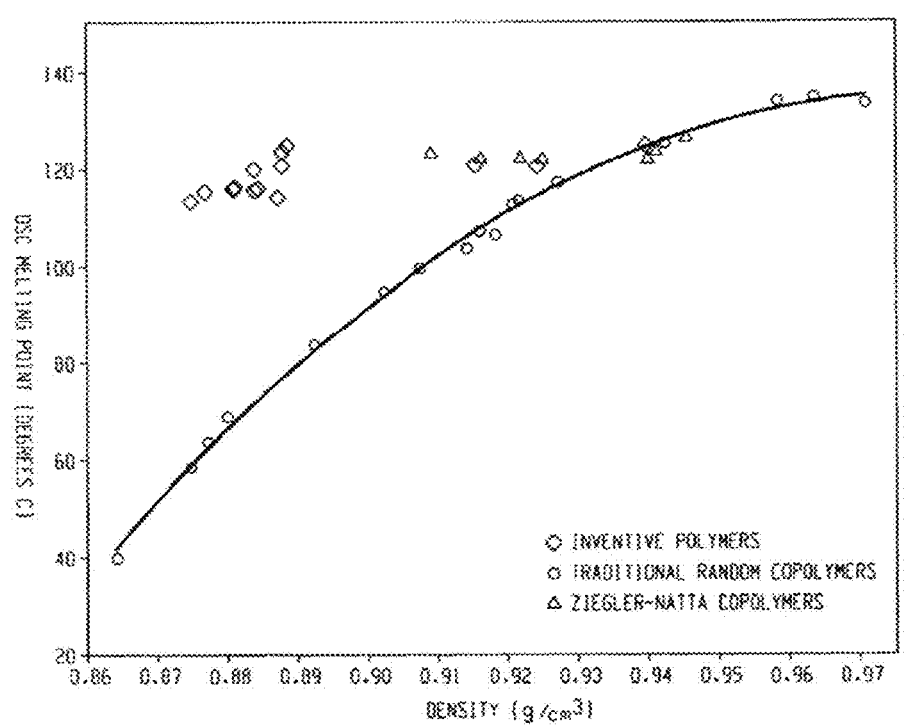
FIG. 2 is a graph showing the melting point/density relationship for ethylene/α-olefin interpolymers.

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/a-olefin polymer" and "propylene/a-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Polyolefin", "polyolefin polymer", "polyolefin resin" and like terms mean a polymer produced from a simple olefin (also called an alkene with the general formula CnH2n) as a monomer. Polyethylene is produced by polymerizing ethylene with or without one or more comonomers, polypropylene by polymerizing propylene with or without one or more comonomers, etc. Thus, polyolefins include interpolymers such as ethylene-α-olefin copolymers, propylene-α-olefin copolymers, etc.

"Melting Point" as used here (also referred to a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

The term "and/or" includes both "and" as well as "or". For example, the term A and/or B is construed to mean A, B or A and B.

"Low crystallinity", "high crystallinity" and like terms are used in a relative sense, not in an absolute sense. However, low crystallinity layers have crystallinity of from about 1 to about 25, preferably from about 1 to about 20, and more preferably from about 1 to about 15 weight percent crystallinity, based on the total weight of the layer. High crystallinity layers have crystallinity of 25 weight percent or greater, based on the total weight of the layer.

High crystalline polymers often include linear low density polyethylene (LLDPE), low density polyethylene (LDPE), LLDPE/LDPE blends, high density polyethylene (HDPE), homopolypropylene (hPP), substantially linear ethylene polymer (SLEP), random propylene based copolymer, random copolymer (RCP), and the like, and various blends thereof. Low crystallinity polymers of particular interest preferably include ethylene/α-olefin multi-block interpolymers defined and discussed in copending PCT Application No. PCT/US2005/008917, filed on Mar. 17, 2005 and published on Sep. 29, 2005 as WO/2005/090427, which in turn claims priority to U.S. Provisional Application No. 60/553,906, filed Mar. 17, 2004, both which are incorporated by reference.

Low crystalline polymers also include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cm$^3$.

"LLDPE" refers to linear ethylene alpha olefin copolymers having a density in the range of from about 0.855 about 0.912 g/cm$^3$ to about 0.925 g/cm$^3$). "LLDPE" may be made using chromium, Ziegler-Natta, metallocene, constrained geometry, or single site catalysts. The term "LLDPE" includes znLLDPE, uLLDPE, and mLLDPE. "znLLDPE" refers to linear polyethylene made using Ziegler-Natta or chromium catalysts and typically has a density of from about 0.912 to about 0.925 and a molecular weight distribution greater than about 2.5, "uLLDPE" or "ultra linear low density polyethylene" refers to linear polyethylene having a density of less than 0.912 g/cm$^3$), but which is made using chromium or Ziegler-Natta catalysts and thus typically have a molecular weight distribution ("MWD") greater than 2.5. "mLLDPE" refers to LLDPE made using metallocene, constrained geometry, or single site catalysts. These polymers typically have a molecular weight distribution ("MWD") in the range of from 1.5 to 8.0. These resins will typically have a density in the range of from about 0.855 to 0.925 g/cm$^3$. Preferred copolymers include 1-hexene and 1-octene.

"MDPE" refers to linear polyethylene having a density in the range of from greater than 0.925 g/cm$^3$ to about 0.940 g/cm$^3$). "MDPE" is typically made using chromium or Ziegler-Natta catalysts or using metallocene, constrained geometry, or single cite catalysts and typically have a molecular weight distribution ("MWD") greater than 2.5.

"HDPE" refers to linear polyethylene having a density in the range greater than or equal to 0.940 g/cm$^3$). "HDPE" is typically made using chromium or Ziegler-Natta catalysts or using metallocene, constrained geometry, or single cite catalysts and typically have a molecular weight distribution ("MWD") greater than 2.5.

"Polypropylene" shall mean polymers comprising greater than 50% by weight of units which have been derived from propylene monomer. This includes homopolymer polypropylene, random copolymer polypropylene, impact copolymer polypropylene, and propylene based plastomers and elastomers. These polypropylene materials are generally known in the art.

As used herein, the term "non-woven web" or "non-woven fabric" or "non-woven substrate or "non-woven", refers to a web that has a structure of individual fibers or fibrous materials which are interlaid, but not in any regular, repeating manner. Non-woven webs have been formed by a variety of processes, such as, for example, air laying processes, meltblowing processes, spunbonding processes and carding processes, including bonded carded web processes.

As used herein, the term "meltblown" refers to the fabrication of non-woven fabrics via a process which generally includes the following steps: (a) extruding molten thermoplastic strands from a spinneret; (b) simultaneously quenching and attenuating the polymer stream immediately below the spinneret using streams of high velocity heated air; (c) collecting the drawn strands into a web on a collecting surface. Meltblown webs can be bonded by a variety of means including, but not limited to, autogeneous bonding, i.e., self bonding without further treatment, thermo-calendaring process, adhesive bonding process, hot air bonding process, needle punch process, hydroentangling process, and combinations thereof.

As used herein, the term "spunbond" refers to the fabrication of non-woven fabric including the following steps: (a) extruding molten thermoplastic strands from a plurality of fine capillaries called a spinneret; (b) quenching the strands of the ethylene-based polymer composition with a flow of air which is generally cooled in order to hasten the solidification of the molten strands of the ethylene-based polymer composition; (c) attenuating the filaments by advancing them through the quench zone with a draw tension that can be applied by either pneumatically entraining the filaments in an air stream or by winding them around mechanical draw rolls of the type commonly used in the textile fibers industry; (d) collecting the drawn strands into a web on a foraminous surface, e.g., moving screen or porous belt; and (e) bonding the web of loose strands into the non-woven fabric. Bonding can be achieved by a variety of means including, but not limited to, thermo-calendaring process, adhesive bonding process, hot air bonding process, needle punch process, hydroentangling process, and combinations thereof.

The non-woven substrate may comprise two or more layers. The two or more layers may be spunbond non-woven fabrics (S), meltblown non-woven layers (M), wet-laid non-woven layers, air-laid non-woven layers, webs produced by any non-woven or melt spinning process. In some embodiments, the non-woven substrate comprises at least one spunbond layer (S) and at least one meltblown layer (M). In other embodiments, the non-woven substrate comprises at least one spunbond layer (S) and at least one meltblown layer (M), and has one of the following structures: SSS, SMS, SMMS, SSMMS, or SSMMMS. In one embodiment the spunbond layer (S) is comprises bicomponent fibers whereby the outermost surface, e.g. sheath in a core/sheath structure or sea in an islands in the sea structure comprised an ethylene based polymer. In another embodiment the meltblown layer also comprises an ethylene based polymer.

The bi-component fibers according to the present invention comprise: (a) from 25 to 95 percent by weight of a first component comprising at least one or more first polymers, based on the total weight of the bi-component fiber; (b) from 5 to 75 percent by weight of a second component comprising at least an ethylene-based polymer composition, based on the total weight of the bicomponent fiber.

Such one or more first polymer compositions include, but are not limited to, propylene based polymers such as interpolymers (including copolymers) of propylene and one or more $\alpha$-olefins, or propylene homopolymers, and polyester or polyester copolymers. The one or more first polymer compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, antiblocks, slip agents, tackifiers, fire retardants, anti-microbial agents, odor reducer agents, anti-fungal agents, and combinations thereof. The one or more first polymer compositions may contain from about 0.01 to about 10 percent by the combined weight of such additives, based on the weight of the ethylene-based polymer composition including such additives.

The bi-component fibers comprise from 5 to 75, for example from 20 to 50, or in the alternative from 25 to 40, percent by weight of a second component comprising at least an ethylene-based polymer composition, based on the total weight of the bicomponent fiber.

The ethylene-based polymer composition comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more $\alpha$-olefin comonomers. The term "ethylene-based polymer composition" refers to a polymer that contains more than 50 mole percent polymerized ethylene monomer (based on the total amount of polymerizable monomers) and, optionally, may contain at least one comonomer.

The $\alpha$-olefin comonomers typically have no more than 20 carbon atoms. For example, the $\alpha$-olefin comonomers may preferably have 3 to 10 carbon atoms, and more preferably 3 to 8 carbon atoms. Exemplary $\alpha$-olefin comonomers include, but are not limited to, propylene, 1-butene, 1-pentene, 1-hexene, 1-heptene, 1-octene, 1-nonene, 1-decene, and 4-methyl-1-pentene. The one or more $\alpha$-olefin comonomers may, for example, be selected from the group consisting of propylene, 1-butene, 1-hexene, and 1-octene; or in the alternative, from the group consisting of 1-hexene and 1-octene.

The term bi-component fiber refers to a fiber which contains two materials whereby the resulting cross-section of the individual fibers resembles sheath/core, tri-lobal, islands in the sea, or a segmented pie, and the like. A common bicomponent fiber configuration is a core-sheath structure, wherein the core comprises homopolymer polypropylene or a polyester and the sheath comprises polyethylene. The polypropylene core provides drawdown capability, spinning stability, heat resistance, modulus, ultimate tensile strength inherent to polypropylene, while the sheath provides the added feature of soft touch, lower bonding temperatures, and higher elongation attributed to the addition of the polyethylene sheath.

As used herein, the term "microfibers", refers to small diameter fibers having an average diameter not greater than about 100 microns. Fibers, and in particular, spunbond and meltblown fibers used in the present invention can be microfibers. More specifically, the spunbond fibers can advantageously be fibers having an average diameter of about 14 to 28 microns, and having a denier from about 1.2 to 5.0, whereas the meltblown fibers can advantageously be fibers having an average diameter of less than about 15 microns, or more advantageously be fibers having an average diameter of less than about 12 microns, or even more advantageously be fibers having an average diameter of less than about 10 microns. It also contemplated that the meltblown fibers may have even smaller average diameters, such as less than 5 microns.

Disclosed herein are multilayered elastic laminates (hereinafter multilayered laminates) that comprise a first non-woven layer (that does not contact human non-woven), a core layer (a non-non-woven layer—hereinafter termed a "film") that comprises a polyethylene elastomer and a second non-woven layer (also called a second non-woven layer) that contacts human skin. In an embodiment, the film comprises a polyethylene elastomer while at least one of the non-woven layers (either the first non-woven layer, the second non-woven layer or both the first and the second non-woven layer) comprise a non-woven, fibrous material (hereinafter non-woven web) that comprises polyethylene. In an embodiment, the non-woven web contains a bi-component fiber wherein the first component of the bicomponent has at least one outer layer of polyethylene and a second component such as a core of polypropylene or polyethylene that has a higher melting point (or a higher flow temperature) than the first component.

Using a polyethylene elastomer as the core of the film provides the multilayered laminate with an ability to stretch to accommodate a wide variety of dimensions and to fit snugly on the body of a human being when it is used in a diaper. The polyethylene elastomer (sometimes referred to as an ethylene based elastomer) film is sometimes termed the "stretch engine". In particular, the use of a polyethylene elastomer as the film gives superior "stretch" and "recovery" force. It provides improved adhesion within layers in the laminate. The use of polyethylene-containing non-woven, fibrous material in at least one of the non-woven layers provides improved adhesion to the elastomeric film and also provides improved haptics and a soft feel while maintaining much of the strength of the monocomponent polypropylene non-woven The elastic laminates may be symmetrical or asymmetrical. When the laminates are symmetrical, the outer non-woven layer (hereinafter the first non-woven layer) is generally similar in chemical composition to the inner non-woven layer (hereinafter the second non-woven layer) and also because the physical form of the first non-woven layer is substantially similar to that of the second non-woven layer. For example, when the first non-woven layer and the second non-woven layer are both non-woven fibrous layers of the same composition, the multilayered laminate may be considered to be a symmetrical laminate. In another embodiment, when the first non-woven layer and the second non-woven layer are different in either composition or in physical structure (e.g., the first non-woven layer is a non-woven fibrous layer while the second non-woven layer is an extruded film) the multilayered laminate is considered to be an asymmetrical laminate.

The multilayer elastic laminate and the first and second non-wovens are intermittently bonded to each other. The "intermittently" bonded laminate is in the form of a web and is sometimes termed a "laminate web". In an exemplary embodiment, the laminates are intermittently bonded to each other using ultrasound. The use of ultrasound is advantageous in that no holes are formed in the laminate during the bonding process. The methods of bonding will be detailed later.

FIG. 1A depicts a section of multilayered laminate 100 that comprises the first non-woven layer 102 (also called the outer layer because it does not contact human non-woven) (hereinafter the first non-woven layer 102), a film 104 (hereinafter the film 104), and the second non-woven layer 106 (also called the inner non-woven layer because it contacts human non-woven) (hereinafter the second non-woven layer 106). The second non-woven layer 106 is disposed on a side of the film 104 that is opposed to the side that contacts the first non-woven layer 102. In an embodiment, the second non-woven layer 106 contacts the film 104 at surface 105 while the first non-woven layer 102 contacts the film 104 at surface 103. Surface 103 is oppositely disposed to surface 105.

While the FIG. 1A discloses a multilayer laminate having three layers, it is indeed possible to use more than three layers such as four, five, six, seven or more layers because the film 104 comprises two or more layers.

In an exemplary embodiment, as shown in the FIG. 1B the film 104 may comprise a plurality of layers, preferably two or more layers, preferably three or more layers, and preferably four or more layers. As seen in the FIG. 1B the film 104 comprises a core layer 104A, one or more optional inner layers 104B and one or more optional outer layers 104C. In an embodiment, the film 104 can be a monolayer film having only the core layer 104A. Alternatively, the film 104 can be a multilayer film comprising a core layer 104A and at least one outer layer 104C. In another embodiment, the film 104 can be a multilayer film comprising a core layer 104A, at least one inner layer 104B and at least one outer layer 104C. It is to be noted that when the outer layer 104C and the inner layer 104B are not present in the film of the FIG. 1B, then the film 104A is a monolayer film and the multilayer laminate has the configuration depicted in the FIG. 1A.

When the film 104 comprises a plurality of layers, the outermost layers 104C are referred to as skin layers. One of the outermost layers is referred to as the first skin layer while the outermost layer on the opposite side of the elastomeric film is referred to as the second skin layer. The first skin layer and the second skin layer may comprise fillers such as slip agents and anti-block agents that facilitate processing of the film 104. In an embodiment, the first skin layer and the second skin layer may comprise a different ethylene elastomer than the ethylene elastomer used in the other intermediate layers of the film. For example, the intermediate layers of the film may contain a first ethylene/α-olefin interpolymer while the first skin layer and the second skin layer may contain a second ethylene/α-olefin interpolymer. The first and the second ethylene/α-olefin interpolymer may be the same or different from one another. In yet another embodiment, the first skin layer and the second skin layer of the film 104 may contain ethylene elastomer that differ compositionally from each other, while the intermediate layers may contain yet another ethylene elastomer that differs in composition than that used in the first and the second skin layers.

The Core Layer 104A

As noted above, the film 104 comprises a core layer 104A that is a polymeric elastomeric layer. In an embodiment, the elastomer can comprise an ethylene based elastomer. The ethylene based elastomer may be olefin block copolymer (OBC) or a random copolymer that contains ethylene. Olefin block copolymers or random copolymers that contain ethylene also known as ethylene/α-olefin interpolymers may be used in the film 104 instead of propylene based polymers. The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 20, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, A's and B's are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprise all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

In an embodiment, the ethylene/α-olefin interpolymers used in embodiments of the invention (also referred to as "interpolymer" or "polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a Mw/Mn from about 1.7 to about 3.5 and at least one melting point, Tm, in degrees Celsius and density, d, in grams/cubic centimeter, wherein the numerical values of the variables correspond to the relationship:

$$Tm > -2002.9 + 4538.5(d) - 2422.2(d)^2, \text{ and preferably}$$

$$Tm \geq 6288.1 + 13141(d) - 6720.3(d)^2, \text{ and more preferably}$$

$$Tm \geq 858.91 - 1825.3(d) + 1112.8(d)^2.$$

Such melting point/density relationship is illustrated in the FIG. 2. Unlike the traditional random copolymers of ethylene/α-olefins whose melting points decrease with decreasing densities, the interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

In another aspect, the ethylene/α-olefin interpolymers comprise, in polymerized form, ethylene and one or more α-olefins and are characterized by a ΔT, in degree Celsius, defined as the temperature for the tallest Differential Scanning calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable inter polymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re>1481-1629(d)$; and preferably $Re \geq 1491-1629(d)$; and more preferably $Re \geq 1501-1629(d)$; and even more preferably $Re \geq 1511-1629(d)$.

In some embodiments, the ethylene/α-olefin interpolymers have a tensile strength above 10 MPa, preferably a tensile strength≥11 MPa, more preferably a tensile strength≥13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of zero percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot2 (4800 Pa), preferably equal to or less than 50 lbs/ft² (2400 Pa), especially equal to or less than 5 lbs/ft² (240 Pa), and as low as 0 lbs/ft² (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer.

Preferably, the $M_w/M_n$ of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the polymer can be determined by referencing this calibration curve using its FWHM methyl:methylene area ratio $[CH_3/CH_2]$ of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013)T+20.07, more preferably greater than or equal to the quantity (−0.2013)T+21.07, where T is the numerical value of the peak elution temperature of the TREF fraction being compared, measured in degrees Celsius.

In addition to the above aspects and properties described herein, the polymers can be characterized by one or more additional characteristics. In one aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the $M_w/M_n$ of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356)T+13.89, more preferably greater than or equal to the quantity (−0.1356)T+14.93, and most preferably greater than or equal to the quantity (−0.2013)T+21.07, where T is the numerical value of the peak ATREF elution temperature of the TREF fraction being compared, measured in degrees Celsius.

In still another aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer has a DSC melting point that corresponds to the equation:

$$T_m \geq (-5.5926)(\text{mol percent comonomer in the fraction})+135.90.$$

In yet another aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)}(3.1718)(ATREF \text{ elution temperature in Celsius})-136.58,$$

The block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)}(1.1312)(ATREF \text{ elution temperature in Celsius})+22.97.$$

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e., area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI=\Sigma(w_i BI_i)$$

where $BI_i$ is the block index for the $i^{th}$ fraction of the ethylene/α-olefin interpolymer obtained in preparative TREF, and $w_i$ is the weight percentage of the $i^{th}$ fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = \frac{LnP_X - LnP_{XO}}{LnP_A - LnP_{AB}}$$

where $T_X$ is the preparative ATREF elution temperature for the $i^{th}$ fraction (preferably expressed in Kelvin), $P_X$ is the ethylene mole fraction for the $i^{th}$ fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1. $T_{AB}$ is the ATREF temperature for a random copolymer of the same composition and having an ethylene mole fraction of $P_{AB}$. $T_{AB}$ can be calculated from the following equation:

$$Ln\, P_{AB}=\alpha/T_{AB}+\beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln\, P=-237.83/T_{ATREF}+0.639$$

$T_{XO}$ is the ATREF temperature for a random copolymer of the same composition and having an ethylene mole fraction of $P_X$. $T_{XO}$ can be calculated from $LnP_X=\alpha/T_{XO}\beta$. Conversely, $P_{XO}$ is the ethylene mole fraction for a random copolymer of the same composition and having an ATREF temperature of $T_X$, which can be calculated from $Ln\, P_{XO}=\alpha/T_X+\beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the ethylene/α-olefin interpolymer is that the ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Further, the polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the polymers possess a relatively flat storage modulus as a function of temperature in the range from 0 to 100° C. that is characteristic of block copolymers, and heretofore unknown for an olefin copolymer, especially a copolymer of ethylene and one or more $C_{3-8}$ aliphatic α-olefins. By the term "relatively flat" in this context is meant that log G' (in Pascals) decreases by less than one order of magnitude between 50 and 100° C., preferably between 0 and 100° C.

The interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the interpolymers can have a thermomechanical analysis penetration depth of 1 mm at a temperature of at least 104°

C. as well as a flexural modulus of at least 3 kpsi (20 MPa). They may be characterized as having an abrasion resistance (or volume loss) of less than 90 mm$^3$.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, Mw, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the polymers can be from 0.80 to 0.99 g/cm$^3$ and preferably for ethylene containing polymers from 0.85 g/cm$^3$ to 0.97 g/cm$^3$. In certain embodiments, the density of the ethylene/α-olefin polymers ranges from 0.860 to 0.925 g/cm$^3$ or 0.867 to 0.910 g/cm$^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety.

The interpolymers also exhibit a unique crystallization and branching distribution relationship. That is, the interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the interpolymers is due to the unique distribution of the comonomer in blocks within the polymer backbone. In particular, the interpolymers may comprise alternating blocks of differing comonomer content (including homopolymer blocks). The interpolymers may also comprise a distribution in number and/or block size of polymer blocks of differing density or comonomer content, which is a Schultz-Flory type of distribution. In addition, the interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in some embodiments are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, and the like. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a C3-C20 alpha olefin, optionally comprising a C4-C20 diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a C3-C20 α-olefin, especially propylene, and optionally one or more diene monomers. Preferred α-olefins for use in this embodiment of the present invention are designated by the formula CH2=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional groups present in the functional interpolymer can vary. The functional group can typically be present in a copolymer-type functionalized interpolymer in an amount of at least 1.0 weight percent, preferably at least 5 weight percent, and more preferably at least 7 weight percent. The functional group will typically be present in a copolymer-type functionalized interpolymer in an amount less than 40 weight percent, preferably less than 30 weight percent, and more preferably less than 25 weight percent.

An exemplary olefin block copolymer comprises ethylene and octene. A commercially available olefin block copolymer that can be used in the core layer 104A of the film 104 is INFUSE™ from the Dow Chemical company.

Another exemplary ethylene for as an elastomer is homogeneously branched ethylene-α-olefin copolymers. These copolymers can be made with a single-site catalyst such as a metallocene catalyst or constrained geometry catalyst, and typically have a melting point of less than 105, specifically less than 90, more specifically less than 85, even more specifically less than 80 and still more specifically less than 75° C. The melting point is measured by differential scanning calorimetry (DSC) as described, for example, in U.S. Pat. No. 5,783,638. The α-olefin is preferably a C3-20 linear, branched or cyclic α-olefin. Examples of C3-20 α-olefins include propene, 1 butene, 4-methyl-1-pentene, 1-hexene, 1 octene, 1-decene, 1-dodecene, 1 tetradecene, 1 hexadecene, and 1-octadecene. The α olefins can also contain a cyclic structure such as cyclohexane or cyclopentane, resulting in an α-olefin such as 3 cyclohexyl-1-propene (allyl cyclohexane) and vinyl cyclohexane.

Illustrative homogeneously branched ethylene-α-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random copolymers or block copolymers.

As noted above, the film 104 can be a monolayer film with no skin layers (i.e., without at least one outer layer 104C or the at least one inner layer 104B). The film can contain an elastomer such as ethylene based olefin block copolymer (INFUSE™ commercially available from the Dow Chemical Company) or a random copolymer (AFFINITY™ commercially available from the Dow Chemical Company, or EXACT™ commercially available from the Exxon Chemical Company or TAFMER™ commercially available from Mitsui or it may contain higher crystallinity ethylene alpha olefin polymers such as LLDPE (DOWLEX™ commercially available from the Dow Chemical Company), metallocene or single site catalyzed materials such as ELITE™ Enhanced PE commercially available from the Dow Chemical Company, or EXCEED™ commercially available from the Dow Chemical Company or it can be a MDPE or HDPE.

At Least One Outer Layer 104C

When the film 104 is a multilayer film (i.e., it comprises a core layer 104A and at least one outer layer 104C) the majority of the film comprises an ethylene based elastomer, which serves as the stretch engine. The optional outer layers 104C are also ethylene containing polymers so they adhere to the majority layer that is the stretch engine. The outer layers can contribute to the elasticity of the film and be the same polymer as the core or they can be different polymers to achieve other characteristics such as: the important thing is that they are ethylene containing so that they bond to the ethylene based component (softness) in the bicomponent non-woven. The optional outer layers can also contribute to functionality of the film.

As detailed above, the at least one outer layer 104C of the film (the first skin layer, the second skin layer or both) independently comprising a second ethylene-based polymer and optionally comprising an antiblock and/or slip agent for handling. The second ethylene-based polymer may be an ethylene α-olefin block copolymer as previously described herein. In some embodiments, the second ethylene-α-olefin block copolymer is an ethylene/octene block copolymer, wherein the ethylene content is greater than 80 mol. % of the whole polymer and the octene content is from 10 to 15 mol. %, or from 15 to 20 mol. % of the whole polymer. In some embodiments herein, the first ethylene α-olefin block copolymer is different from the second ethylene-α-olefin block copolymer. In some embodiments the second ethylene based polymer is a random copolymer of ethylene and another alpha-olefin.

In embodiments herein, the second ethylene-α-olefin block copolymer has a density of from 0.850 g/cc to 0.890 g/cc, from 0.850 g/cc to 0.885 g/cc, from 0.855 g/cc to 0.880 g/cc, or from 0.860 g/cc to 0.879 g/cc. In some embodiments, the density of the first ethylene-α-olefin block copolymer is equal to or greater than the density of the second ethylene-α-olefin block copolymer. In other embodiments, the density of the first ethylene-α-olefin block copolymer is less than the density of the second ethylene-α-olefin block copolymer.

In embodiments herein, the second ethylene-α-olefin block copolymer has a melt index (MI) from 0.1 g/10 min to 25 g/10, 0.5 g/10 min to 25 g/10 min, 0.5 g/10 min to 10 g/10 min, and 0.5 to 5 g/10 min when measured as per ASTM D1238 (190° C./2.16 kg). In another embodiment the second ethylene-α-olefin block copolymer has a melt index (MI) from 1 to 20 g/10 min, 2 to 15 g/10 min, or 2 to 10 g/10 min, as measured by ASTM D 1238 (190° C./2.16 kg). In some embodiments, the melt index of the first ethylene-α-olefin block copolymer is different than the melt index of the second ethylene-α-olefin block copolymer.

The second ethylene-α-olefin block copolymer may independently comprise at least 60 wt % of the at least one outer layer. For example, in some embodiments, the second ethylene-α-olefin block copolymer may independently comprise at least 65 wt %, 70 wt %, 75 wt %, 80 wt %, 85 wt %, 90 wt %, 95 wt %, or 99 wt % of the at least one outer layer.

The second ethylene-α-olefin block copolymer may have a low to high level of crystallinity. For example, in some embodiments, the second ethylene-based polymer has a crystallinity from a lower limit of 1%, 2% or 3% to an upper limit of 28%, 30%, or 35%. In embodiments herein, the crystallinity of the first ethylene-α-olefin block copolymer may be greater than or equal to the crystallinity of the second ethylene-α-olefin block copolymer. In other embodiments herein, the crystallinity of the second ethylene-α-olefin block copolymer may be greater than or equal to the crystallinity of the first ethylene-α-olefin block copolymer.

The crystallinity may also be described in terms of thermal energy. The thermal energy (or heat of fusion) for 100% crystalline polypropylene is taken to be 165 J/g, and for 100% crystalline polyethylene is 292 J/gm. The second ethylene-α-olefin block copolymer may have a heat of fusion, as determined by DSC, ranging from a lower limit of about 1 Joules/gram (J/g), or 3 J/g, or 5 J/g, or 7 J/g, to an upper limit of about 100 J/g, 95 J/g, 90 J/g, or 85 J/g. In embodiments herein, the first ethylene-α-olefin block copolymer has a heat of fusion greater than or equal to the second ethylene-α-olefin block copolymer.

In an embodiment, the outer layer 104C may not contain an elastomer (that has a low level of crystallinity) but can contain a non-elastomeric layer that comprises an ethylene based polymer that could have a higher amount of crystallinity. Examples of higher crystallinity ethylene based polymers are LLDPE, m-LLDPE, post metallocene catalyzed LLDPE, MDPE, or HDPE, random propylene-ethylene copolymers (RCPP) such as VERSIFY™ or VISTAMAXX™, or RCPP with lower levels of ethylene, 1-5% ethylene, such as 6D83 formerly produced by the Dow Chemical Company.

The optional outer layers can contribute to the functionality of the film. It can contribute features such as enhanced processability and ease of handling. Ease of processability and ease of handling may be achieved by incorporating into the outer layer an elastomer or polymer that has different melt index or a different weight average molecular weight as a result of which it has different flow characteristics. These different flow characteristics may be used to achieve optimal processing in conventional processes such as blown or cast film fabrication processes.

The level of crystallinity may also be reflected in the melting point. "Melting point" is determined by DSC. The second ethylene-α-olefin block copolymer may have one or more melting points, with the peak having the highest heat flow (i.e., tallest peak height) being considered the melting point. The second ethylene-α-olefin block copolymer may have a melting point, as determined by DSC, ranging from a lower limit of about 20° C., or 25° C., or 30° C., or 35° C., or 40° C. or 45° C. to an upper limit of about 128, or 125, or 120° C.

The at least one outer layer may comprise a polymer blend comprising the second ethylene-α-olefin block copolymer with one or more additional outer layer polymers suitable for melt processing in blown film, cast film, extrusion coating processes or enhancing or modifying elastic performance or to reduce tackiness or blockiness of the elastic structure, which may include, for example, low density polyethylene suitable for improving processability, LLDPE or HDPE to reduce blockiness or stickiness. It may also include, one or more additional ethylene-α-olefin block copolymers as described herein, ethylene random copolymers, such as, the INFUSE™ or AFFINITY™ resins commercially available from The Dow Chemical Company and the EXACT™ resins commercially available from Exxon Mobil Corporation to achieve the overall molecular weight suitable for processing in conventional fabrication equipment such as blown and cast film. For example, a lower molecular weight olefin block copolymer (e.g. MI>10) may be combined with a higher molecular weight (e.g. MI<0.7) to achieve an overall Mw that is suitable for processing in cast film. The higher molecular weight component can enhance the hysteresis performance of the overall blend while the lower molecular weight will enhance the processability.

In some embodiments, the at least one outer layer (e.g., the first or the second skin layer) independently comprises a polymer blend comprising the second ethylene-α-olefin block copolymer and one or more additional ethylene-α-olefin block copolymers having a density of 0.850 g/cc to 0.890 g/cc and a melt index of 0.5 g/10 min to 25 g/10 min.

In embodiments herein, the at least one outer layer independently comprises an antiblock agent. Examples of suitable antiblock agents may include, but are not limited to, clay, aluminum silicate, diatomaceous earth, silica, talc, calcium carbonate, limestone, fumed silica, magnesium sulfate, magnesium silicate, alumina trihydrate, magnesium oxide, zinc oxide, titanium dioxide, or combinations thereof. In some embodiments, the antiblock agent is selected from the group consisting of talc, calcium carbonate, silica, nephilene syenite, and combinations thereof. Other suitable antiblock agents can be found in U.S. Pat. No. 7,741,397 and Zweifel Hans et al., "Plastics Additives Handbook," Hanser Gardner Publications, Cincinnati, Ohio, 5th edition, Chapter 7, pages 585-600 (2001), which are incorporated herein by reference.

The antiblock agent may be independently present in the at least one outer layer in amounts ranging from 2.5 wt % to 30 wt %. In some embodiments, the antiblock agent may be independently present in the at least one outer layer in amounts ranging from 2.5 wt % to 25 wt %, 2.5 wt % to 20 wt %, 2.5 wt % to 18 wt %, 3.5 wt % to 18 wt %, 5 wt % to 20 wt %, 5 wt % to 18 wt %, or 5 wt % to 15 wt % of the at least one outer layer. Suitable methods for incorporating antiblock agents into a carrier resin are known to those of ordinary skill in the art and can include, for example, melt blending or solution blending, which may be performed using, for example, an extruder (single-screw, twin-screw) or static mixer. In some embodiments, an antiblock masterbatch containing the desired amount of antiblock agent is incorporated during the film preparation step by dry blending with other polymer resins.

For example, in a melt extrusion process, the shear and heat imparted will result in the melting of the masterbatch and the distribution of the antiblock agent throughout a melt stream that will subsequently become one or more layers disclosed herein. Of course, other suitable methods for incorporating antiblock agents into the one or more layers may be used, taking into consideration the carrier resin, slip agent, compatibilizers, process aids, stabilizers, modifiers, pigments, and/or other components that may be included in the masterbatch formulation.

The at least one outer layer may optionally comprise one or more slip agents. Examples of suitable slip agents are outlined above. In some embodiments, the film further comprises a slip agent in the at least one outer layer. In other embodiments, the film further comprises a slip agent in the at least one outer layer, and optionally, in the film. In further embodiments, the film further comprises a slip agent in the at least one outer layer and the film. The total amount of the one or more slip agents independently present in the at least one outer layer may range from 0 to 1 wt %. All individual values and subranges are included and disclosed herein. For example, in some embodiments, the total amount of the one or more slip agents present in the at least one outer layer is from 0 to 0.5 wt %. In other embodiments, the total amount of the one or more slip agents present in the at least one outer layer is from 0.05 to 0.3 wt %. Suitable methods for incorporating slip agents into a carrier resin are previously described above.

In some embodiments, compatibilizers may also be present in the at least one outer layer. Compatibilizers may be used for a variety of reasons including, increasing the ability of a polymer to wet the surface of antiblock agents. Polymeric compatibilizers may comprise polymers or blends thereof with functional groups, such as, polar functional groups. Suitable compatibilizers for the present invention include, but are not limited to, ethylene ethyl acrylate (AMPLIFY™ EA), maleic anhydride grafted polyethylene (AMPLIFY™ GR), ethylene acrylic acid (PRIMACOR™), ionomers (AMPLIFY™ IO), and other functional polymers (AMPLIFY™ TY), all of which are available from The Dow Chemical Company; maleic anhydride styrenic block copolymer (KRATON™ FG), available from Kraton Polymers; maleic anhydride grafted polyethylene, polypropylene, copolymers (EXXELOR™), available from The ExxonMobil Chemical Company; modified ethylene acrylate carbon monoxide terpolymers, ethylene vinyl acetates (EVAs), polyethylenes, metallocene polyethylenes, ethylene propylene rubbers and polypropylenes with acid, maleic anhydride, acrylate functionality (FUSABOND™, BYNEL™, NUCREL™, ELVALOY™ ELVAX™) and ionomers (SURLYN™), available from E. I. du Pont de Nemours and Company.

Optional Inner Layers 104B

As noted above, in some embodiments herein the film may comprise one or more optional inner layers 104B (also referred to herein as the intermediate layers). The inner layer may comprise a third ethylene-α-olefin block copolymer, which may be an ethylene-α-olefin block copolymer as previously described herein. In some embodiments, the second ethylene α-olefin block copolymer is different from the third ethylene-α-olefin block copolymer. In other embodiments, the first ethylene α-olefin block copolymer is different from the third ethylene-α-olefin block copolymer. In further embodiments, the first and second ethylene α-olefin block copolymers are different from the third ethylene-α-olefin block copolymer.

In embodiments herein, the third ethylene-α-olefin block copolymer has a density of from 0.850 g/cc to 0.890 g/cc, from 0.850 g/cc to 0.885 g/cc, from 0.855 g/cc to 0.880 g/cc, or from 0.860 g/cc to 0.879 g/cc. In some embodiments, the third ethylene-α-olefin block copolymer has a density that is equal to or greater than the density of the second ethylene-α-olefin block copolymer. In embodiments herein, the third ethylene-α-olefin block copolymer has a melt index (MI) from 0.1 g/10 min to 10 g/10, 0.5 g/10 min to 5 g/10 min, 0.5 g/10 min to 3 g/10 min, 0.5 g/10 min to 2 g/10 min, 0.5 g/10 min to 1.5 g/10 min, 0.5 g/10 min to 1 g/10 min, or 0.5 g/10 min to less than 1 g/10 min, as measured by ASTM D 1238 (190° C./2.16 kg). In some embodiments, the third ethylene-α-olefin block copolymer is an ethylene/octene block copolymer, wherein the ethylene content is greater than 80 mol. % of the whole polymer and the octene content is from 10 to 15, or from 15 to 20 mol. % of the whole polymer.

The third ethylene-α-olefin block copolymer may comprise at least 50 wt % of the inner layer. For example, in some embodiments, the third ethylene-α-olefin block copolymer may comprise at least 55 wt % of the inner layer, 60 wt % of the inner layer, 65 wt % of the inner layer, 70 wt % of the inner layer, 75 wt % of the inner layer, at least 85 wt % of the inner layer, at least 95 wt % of the inner layer, at least 99 wt % of the inner layer, or at least 100 wt % of the inner layer.

In some embodiments, the inner layer may also comprise the third ethylene-α-olefin block copolymer and one or more additional polymers suitable for melt processing in blown film, cast film, extrusion coating processes or enhancing or modifying elastic performance, which may include, for example, low density polyethylene suitable for improving processability, among other things, one or more additional ethylene-α-olefin block copolymers as described herein, ethylene random copolymers, such as, the INFUSE™ or AFFINITY™ resins commercially available from The Dow Chemical Company and the EXACT™ resins commercially available from Exxon Mobil Corporation. The one or more additional polymers may comprise less than 30 wt %, less than 25 wt %, less than 20 wt %, less than 15 wt %, less than 10 wt %, or less than 5 wt % of the inner layer.

Similar to the core and the at least one outer layer, the inner layer may optionally comprise one or more slip agents as outlined above. In some embodiments, the film further comprises a slip agent in the inner layer. In other embodiments, the film further comprises a slip agent in the at least one outer layer and inner layer, and optionally, the film. In further embodiments, the film further comprises a slip agent in the at least one outer layer, the film, and the inner layer. The total amount of the one or more slip agents present in the inner layer may range from 0 to 1 wt %, based on the total weight of the inner layer. All individual values and subranges are included and disclosed herein. For example, in some embodiments, the total amount of the one or more slip agents present in the at least one outer layer is from 0 to 0.5 wt %. In other embodiments, the total amount of the one or more slip agents present in the at least one outer layer is from 0.05 to 0.3 wt %.

Films & Laminates

The film may further comprise non-polymeric additives that can be added to one or more layers. Exemplary additives may include, process oil, flow improvers, fire retardants, antioxidants, plasticizers, pigments, vulcanizing or curative agents, vulcanizing or curative accelerators, cure retarders, processing aids, UV stabilizers, antistats, pigments, flame retardants, tackifying resins, and the like. These compounds may include fillers and/or reinforcing materials. Other additives, which may be employed to enhance properties, include coloring agents. Lubricants, nucleating agents, reinforcements, and fillers (including granular, fibrous, or powder-like) may also be employed. The exemplary lists provided above are not exhaustive of the various kinds and types of additives that can be employed with the present invention.

In embodiments herein, the film may be a cast film or a blown film. The overall thickness of the film is not particularly limited, but, in some embodiments, may be less than 20 mils, less than 16 mils, less than 10 mils, or less than 5 mils. The thickness of any of the individual layers can vary widely, and may be determined by process, use and economic considerations.

It has been found that the films described herein may minimize the probability and severity of film blocking on rolls prior to lamination. Blocking refers to a defect in which film layers on a roll fuse or adhere together making the roll difficult to unwind for subsequent processing steps. Without intending to be bound by theory, it is believed that films described herein minimize the tendency of blocking by lowering temperature, pressure, various pressure points, in-wound tension, and surface area contact. It should be understood, however, that the need to minimize blocking is balanced against competing needs, such as, film handling, and other subsequent conversion steps. Various methods suitable for quantifying film blocking include ASTM D3354-11, ISO 11502, and others.

It has been found that the films described herein may exhibit a reduction in permanent set as compared to an identical film that has not been stretch-modified. In some embodiments, the film may exhibit a 2.5% reduction in permanent set as compared to an identical film that has not been stretch-modified. In other embodiments, the film may exhibit a 5% reduction in permanent set as compared to an identical film that has not been stretch-modified. In further embodiments, the film may exhibit a 7.5% reduction in permanent set as compared to an identical film that has not been stretch-modified. In even further embodiments, the film may exhibit a 10% reduction in permanent set as compared to an identical film that has not been stretch-modified.

It has been found that the films described herein may exhibit a first cycle retraction force that is greater than a first cycle retraction force of an identical film that has not been stretch-modified. In some embodiments, the film may exhibit a first cycle retraction force that is at least 25% greater than a first cycle retraction force of an identical film that has not been stretch-modified. In other embodiments, the film may exhibit a first cycle retraction force that is at least 30% greater than a first cycle retraction force of an identical film that has not been stretch-modified. In further embodiments, the film may exhibit a first cycle retraction force that is at least 35% greater than a first cycle retraction force of an identical film that has not been stretch-modified. In even further embodiments, the film may exhibit a first cycle retraction force that is at least 45% greater than a first cycle retraction force of an identical film that has not been stretch-modified. In even further embodiments, the film may exhibit a first cycle retraction force that is at least 50% greater than a first cycle retraction force of an identical film that has not been stretch-modified.

It has been found that the films described herein may exhibit a second cycle retraction force that is greater than a second cycle retraction force of an identical film that has not been stretch-modified. In some embodiments, the film may exhibit a second cycle retraction force that is at least 20% greater than a second cycle retraction force of an identical film that has not been stretch-modified. In other embodiments, the film may exhibit a second cycle retraction force that is at least 25% greater than a second cycle retraction force of an identical film that has not been stretch-modified. In further embodiments, the film may exhibit a second cycle retraction force that is at least 35% greater than a second cycle retraction force of an identical film that has not been stretch-modified. In even further embodiments, the film may exhibit a second cycle retraction force that is at least 45% greater than a second cycle retraction force of an identical film that has not been stretch-modified. In even further embodiments, the film may exhibit a second cycle retraction force that is at least 50% greater than a second cycle retraction force of an identical film that has not been stretch-modified.

It has been found that the films described herein may exhibit a haze value that is less than a haze value of an identical film that has not been stretched-modified. Without being bound by theory, it is believed that since the stretch-modified films do not undergo plastic deformation, they result in a decrease in surface roughness (due to differential recovery behavior), and therefore, a decrease in haze values. In some embodiments, the film may exhibit a haze value that is at least 2% less than a haze value of an identical film that has not been stretched-modified. In other embodiments, the film may exhibit a haze value that is at least 3% less than a haze value of an identical film that has not been stretched-modified. In further embodiments, the film may exhibit a haze value that is at least 5% less than a haze value of an identical film that has not been stretched-modified. Haze is measured according to ASTM D1003 using a HazeGard PLUS Hazemeter available from BYK Gardner of Melville, N.Y., with a light source CIE Illuminant C.

The Non-Woven Layers 102 and 106

As noted above, the non-woven layers 102 and 106 each comprise a non-woven web. The non-woven web is comprised of at least one layer (adjacent to the film) which is comprised of bicomponent fibers wherein the bicomponent fibers comprise an ethylene based polymer. The bicomponent fibers generally contain another polymer in addition to the ethylene based polymer. The non-woven layers 102 and 106 can each comprise a mono constituent type of non-woven where all layers are the same or multi-constituent non-woven where the layers may vary in polymer type and type of non-woven.

Mono-Constituent Non-Woven

The mono-constituent non-woven comprises bicomponent fibers where the first component (occupying at least a portion of the surface of the fiber) contains an at least one ethylene-based polymer (such as Dow's ASPUN™ 6850, or ASPUN 6000), Z-N polyethylenes, m-LLDPE, or post metallocene polyethylene to provide softness and improved bonding to the ethylene-based film during the ultrasonic bonding process. In some embodiments, the first component is an ethylene containing polymer such as a polypropylene impact copolymer as detailed in U.S. patent application having Ser. No. 12/859,499 where the dispersed phases contains a propylene/alpha-olefin copolymer and where the α-olefin copolymer is ethylene. The second component is a polymer that has a higher melting point than the first component. Examples include homopolypropylene (hPP, random copolymers of polypropylene or polyethylene terephthalate. The higher melting point second component polymer (while not being bound to the theory) does not completely melt/flow and provides a level of integrity and strength at the ultrasonic bond point. The mono-constituent non-woven may be comprised of multiple layers of the same bicomponent non-woven. If they are indeed the same, they could be a multi-beam spunbond composite non-woven such as a bicomponent SSS structure (which is detailed below). In preferred embodiments the film is sandwiched between 2 non-woven structures. The 2 non-woven structures can be the same (symmetric) or different (asymmetric).

Multi-Constituent Non-Woven

The non-woven web may comprise a plurality of layers if desired, whereby the plurality of layers are different and serve a similar purpose to a non-woven comprising a bicomponent fabric. With reference to the FIG. 1A, layers 102 and/or 106 can comprise a plurality of non-woven layers. The layer 102 can for example comprise an inner non-woven layer that contacts the film 104 and at least one outer non-woven layer that contacts a surface of the inner non-woven layer.

The inner non-woven layer (that contacts an outer layer of the film 104—see FIG. 1A) comprises an ethylene based polymer to provide as noted above in the section pertaining to monolayer non-wovens and or ethylene containing polymers such as described in U.S. patent application having Ser. No. 12/859,499 or propylene ethylene random copolymers as described above. The inner layer will contain an ethylene-containing polymer comprising a lower melting material than the at least one outer non-woven layer and the inner layer will melt or flow when bonded ultrasonically and will provide the adhesion to the film while the outer layer will not completely flow but will remain intact at the bond point and help provide the strength and integrity to the laminate structure. Examples of such structures would be an inner layer of spunbond comprising a propylene-ethylene random copolymer and an outer layer of homopolymer polypropylene.

In this case both layers must be adequately bonded together either prior to or during the ultrasonic lamination step between the film and the non-wovens. In preferred embodiments all layers contain at least one ethylene based or ethylene containing polymer to provide the highest level of strength of the laminate structure.

In the three or more layer structure the two outer layers, one that is adjacent to the film and one that is away from the film can be the same or different. In preferred embodiments the film is sandwiched between two non-woven structures. The laminate containing the multilayer non-woven structures can be the same (symmetric) or different (asymmetric). Details about the non-woven web are provided below.

The non-woven web may comprise a single web, such as a spunbond web, a carded web, an airlaid web, a spunlaced web, or a meltblown web. However, because of the relative strengths and weaknesses associated with the different processes and materials used to make non-woven fabrics, composite structures of more than one layer are often used in order to achieve a better balance of properties. Such structures are often identified by letters designating the various lays such as SM for a two layer structure consisting of a spunbond layer and a meltblown layer, SMS for a three layer structure, or more generically $SX_nS$ structures, where X can be independently a spunbond layer, a carded layer, an airlaid layer, a spunlaced layer, or a meltblown layer and n can be any integer number, although for practical purposes is generally less than 5, such as 4, 3, 2 or 1. In order to maintain structural integrity of such composite structures, the layers must be bonded together. Common methods of bonding include point bonding, adhesive lamination, and other methods known to those skilled in the art. All of these structures may be used in the present invention.

The fibers which make up the non-woven web are bicomponent fibers comprising at least one surface component that is an ethylene based polymer is preferred that the surface of the fiber comprise a polyethylene resin other than LDPE. The polyethylene resin can advantageously be a single site catalyzed resin (mLLDPE), or a post metallocene catalyzed LLDPE, or a Ziegler-Natta catalyzed LLDPE, or HDPE, or MDPE.

If bicomponent fibers are used, it is preferred that the fibers be in a sheath-core form, with the sheath comprising an ethylene based polymer other than LDPE. The core of such fibers may comprise homopolymer polypropylene (hPP), polyester or an elastomeric polymer. It is preferred that the sheath comprise 10 to 70 wt % of the fiber, preferably 10 to 50 wt %, and more preferably 20 to 50 wt % of the fiber. In an embodiment, the core has a higher flow temperature or peak melting temperature than that of the sheath.

It is also contemplated that the non-woven web for uses in the structure of the present invention may comprise bicomponent staple fibers that are formed into a non-woven via a carding process and thermally bonded via an airthrough bonding process. Such webs are referred to as air through bonded, carded webs. The bicomponent staple fibers can be in a sheath-core form, with the sheath comprising an ethylene based polymer such as Ziegler Natta catalyzed LLDPE, m-LLDPE, or post metallocene catalyzed LLDPE. The core of such fibers may comprise homopolymer polypropylene (hPP), polyester or an elastomeric polymer. It is preferred that the sheath comprise 10 to 70 wt % of the fiber, preferably 10 to 50 wt %, and more preferably 20 to 50 wt % of the fiber.

In one embodiment, both the first non-woven layer 102 and the second non-woven layer 104 comprise either monocomponent or bicomponent fibers. In this event, the multilayered laminate is a symmetrical laminate.

In one preferred embodiment, the first non-woven layer 102 comprises a monocomponent fiber that comprises polyethylene while the second non-woven layer 106 comprises a bicomponent fiber that has a polyethylene sheath and a polypropylene or polyester core. In this event, the multilayered laminate is an asymmetrical laminate. It is to be noted that the location of the monocomponent fiber non-woven layer and that of the bicomponent fiber non-woven layer can be interchanged. For example, the first non-woven layer 102 may comprise the bicomponent fiber while the second non-woven layer 106 comprises the monocomponent fiber.

In another embodiment, the first non-woven layer 102 comprises a monocomponent fiber that comprises polypropylene while the second non-woven layer 106 comprises a bicomponent fiber that has a polyethylene sheath and a polypropylene or polyester core. In this event, the multilayered laminate is also an asymmetrical laminate. As detailed above, the layers comprising the monocomponent fibers and the layers comprising the bicomponent fiber are interchangeable.

The non-wovens can also be laminates such as spunbond layers and some meltblown layers, such as a spunbond/meltblown/spunbond (SMS) laminate and others as disclosed in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., and U.S. Pat. No. 5,188,885 to Timmons et al., each incorporated by reference in their entirety. The non-woven may be an elastic non-woven comprised of elastic materials or an extensible non-woven, such as, spunlaced materials which are hydroentangled spun-melt non-wovens. The non-woven may be inelastic, but elongatable or extensible. Such inelastic non-wovens may be used in elastic laminates by bonding them to the elastic film while the elastic film is in a stretched condition so that when the elastic film is allowed to retract the non-woven gathers or puckers between the portions where the non-woven is bonded to the elastic film creating corrugations in the non-wovens. This live stretch process of lamination is described in U.S. Pat. No. 4,720,415. Other means of corrugating non-wovens are available commercially, such as those supplied by Micrex. Extensible, but inelastic non-wovens can also be used in elastic laminates through a process described as incremental stretching. In these processes the elastic film and extensible, but nonelastic non-woven are joined in the unstretched state. The laminate is then subjected to stretching or tension as described in U.S. Pat. Nos. 5,167,897, 4,107,364, 4,209,463, and 4,525,407. When the tension is released on the web the non-woven is permanently deformed in the areas where it was stretched and does not go back to its original shape so that the elastic laminate is now able to stretch and recover without significant constraint from the non-woven in the areas where it has been pre-stretched.

Manufacturing of the Multilayer Laminates

The multilayer laminates disclosed herein may be manufactured by a variety of different methods. In an embodiment, the film 104 is manufactured by mixing together the olefin block copolymer and other desired ingredients such as fillers, anti-block agents and the like. Following extrusion, the film is either cast or blown. In an embodiment a plurality of layers may be cast or blown in a coextruded manner. The film(s) 104 may then activated by stretching. The activation may improve the elasticity of the film. The elongating or stretching may be conducted in at least one direction. In another embodiment, the elongation is conducted in at least two directions—a machine direction (the direction in which the layers are extruded) and a cross direction (a direction perpendicular to the machine direction).

The laminates may be formed by providing a monolayer film or a multilayer film. In the case of a multilayer film, the film comprises a core layer comprising a first ethylene based elastomer. In a preferred embodiment the ethylene based elastomer is an ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc; preferably 0.850 to 870 g/cc, more preferably 0.855-0.870 g/cc and most preferably 0.860-0.870 g/cc. and at least one outer layer independently comprising a second ethylene based polymer or ethylene-containing polymer/α-olefin block copolymer and from 2.5 to 30 wt. % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc; performing a first stretch of the film in at least one direction to a draw ratio of at least 1.9 to form a stretch-modified multilayer film; optionally substantially relaxing the stretch-modified multilayer film in the at least one direction. In some embodiments, a first stretch of the film is performed in at least one direction a draw ratio of at least 2.0, preferably at least 3.6 to form the stretch-modified multilayer film. In other embodiments, a first stretch of the film is performed in at least one direction to a draw ratio of at least 4.5 to form the stretch-modified multilayer film. In further embodiments, a first stretch of the film is performed in at least one direction to a draw ratio of at least 5.7 to form the stretch-modified multilayer film.

Stretching may be accomplished by methods known in the art, such as, ring rolling, tenter framing, incremental stretching, or other suitable methods known in the art. Examples of stretching methods can also be found in U.S. Pat. or Publication Nos. 4,368,565, 5,143,679, 5,156,793, 5,167,897, 8,337,190, 2003/0088228, or 2004/0222553, all of which are herein incorporated by reference. For illustration purposes only, in some embodiments, stretching is accomplished through the use of at least one pair of intermeshed grooved rolls or intermeshed discs. See, for e.g., U.S. Pat. Nos. 4,153,751, 4,368,565, International App. No. WO 2004/020174, and U.S. Pub. No. 2006/0003656, all of which are herein incorporated in their entirety by reference.

In some embodiments, the process further comprises laminating the optionally stretch-modified multilayer film to at least one substrate to form a laminate. As previously noted herein the substrate may be a nonwoven, an elastic nonwoven, or an extensible, but non-elastic nonwoven. In some embodiments, the laminates may be formed using a process that is in-line with the stretching. The film may be sandwiched between two separate substrates or non-woven laminates.

The laminates may undergo subsequent processing steps to provide a finished, desired product. For example, in some embodiments, the laminate may be subjected to a second stretch in at least one direction to a draw ratio of 3.6 or less of its pre-second stretch length. Such methods are often applied to extensible, non-elastic nonwoven film laminates to make them more elastic. Examples of such similar stretching methods are described above. It should be understood that this step is optional, and in other embodiments, the laminate does not undergo a second stretch. Additional embodiments are described and illustrated in the accompanying figures.

Figure 3:
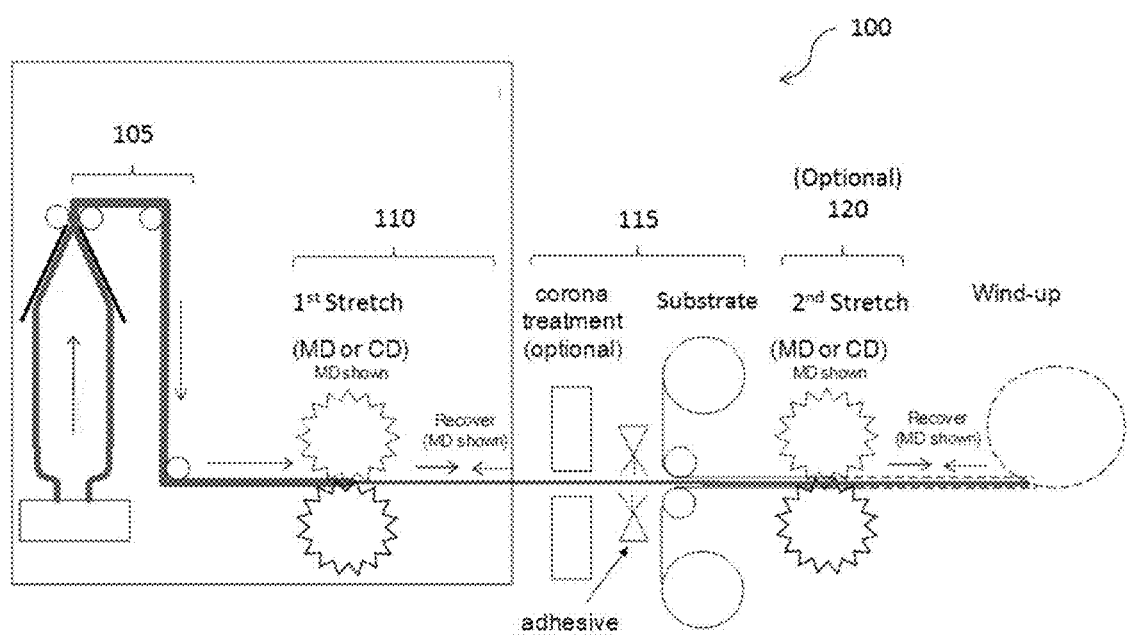
FIG. 3 depicts an in-line blown film process that may be used to prepare stretch-modified multilayer films.

Referring to FIG. 3, depicted is an in-line blown film process (200) that may be used to prepare stretch-modified multilayer films. In a first step (205), a multilayer blown film is coextruded. The multilayer film may comprise a core layer comprising a first ethylene-α-olefin block copolymer, wherein the first ethylene-α-olefin block copolymer comprises at least 50 mol. % ethylene, has a melt index (I$_2$) from 0.5 g/10 min to 5 g/10 min, and has a density of 0.850 g/cc to 0.890 g/cc; and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index (I2) from 0.5 g/10 min to 25 g/10 min, and has a density of 0.850 g/cc to 0.890 g/cc, and wherein the density of the first ethylene-α-olefin block copolymer is equal to or greater than the density of the second ethylene-α-olefin block copolymer. In a second step (210), the multilayer blown film may optionally be then stretched in at least one direction to a draw ratio of at least 1.9 to form a stretch-modified multilayer film. The optionally stretch-modified multilayer film may be allowed to substantially relax in the at least one direction prior to lamination. In another embodiment, the multi-layer film may not be allowed to substantially relax in the at least one direction prior to laminating to the non-woven.

In the embodiment where the film is not relaxed prior to lamination in a third step (215), the optionally stretch modified multilayer film is ultrasonically bonded to laminate the film to the at least one non-woven to create multi-layer film/non-woven laminate.

In some embodiments, at least one of the surfaces of the stretch-modified multilayer film may optionally be treated by flame, plasma, or corona to improve properties, such as, adhesion or printability. Prior to lamination, an adhesive, for e.g., a hot melt adhesive, may also be optionally applied either to the stretch-modified multilayer film or substrate. In an optional fourth step (220), the laminate may undergo a second stretch in at least one direction to a draw ratio of 3.6 or less. Such optional steps are used with the film is laminated to an extensible but non-elastic non-woven when the film is substantially relaxed or in an unstretched state. In some embodiments, the laminate does not undergo a second stretch such as when the film is laminated to the non-woven while in its stretched state as described in step two where the film is not allowed to substantially relax prior to laminating to the non-woven. In embodiments where the laminate has undergone a second stretch, the laminate may be allowed to substantially relax in the at least one direction of the second stretch. The laminate may then be wound into a roll. It should be understood herein that the process shown and described in FIG. 3 is merely exemplary, and it would be obvious to those skilled in the art that various other changes and modifications can be made without departing from the spirit and scope of the invention. For example, each step may be performed continuously (i.e., in-line as shown), semi-continuously, or in separate unit operations. In some embodiments, an intermediate material may be produced that, in some examples, may be temporarily wound into a roll until it is ready for further processing, at which point, the intermediate material is unwound and processed. The intermediate material may be produced after one or more process steps.

Figure 4:
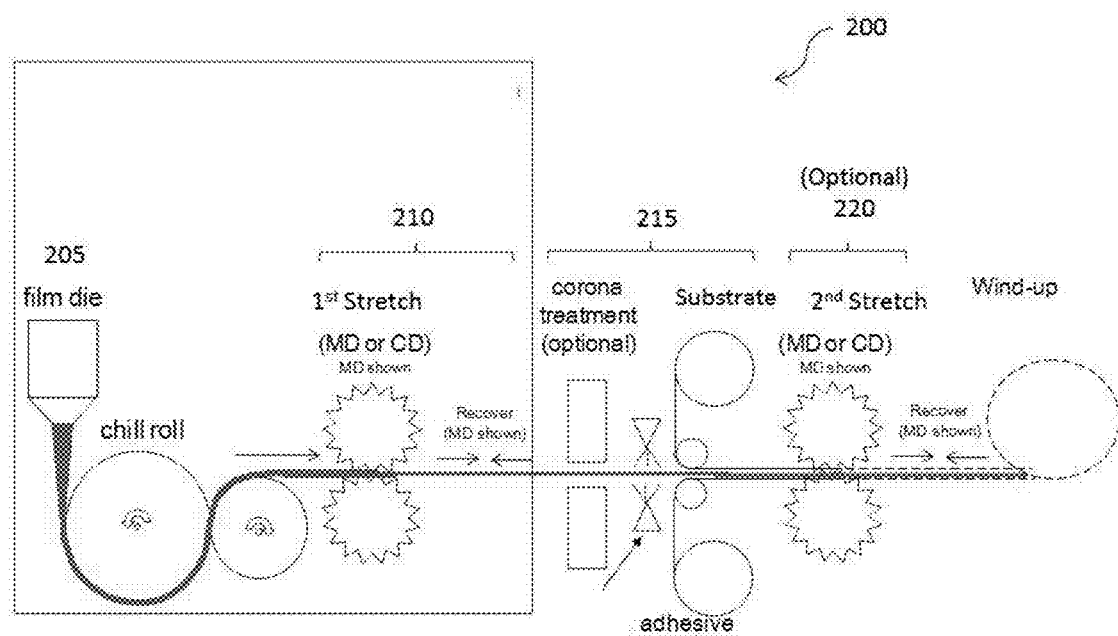
FIG. 4 depicts is an in-line cast film process that may be used to prepare stretch-modified multilayer films.

Referring to FIG. 4 depicted is an in-line cast film process (200) that may be used to prepare stretch-modified multilayer films. In a first step (205), a multilayer cast film is coextruded. The multilayer film may comprise a core layer comprising a first ethylene-α-olefin block copolymer, wherein the first ethylene-α-olefin block copolymer comprises at least 50 mol. % ethylene, has a melt index (I$_2$) from 0.5 g/10 min to 5 g/10 min, and has a density of 0.850 g/cc to 0.890 g/cc; and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index (I$_2$) from 0.5 g/10 min to 25 g/10 min, and has a density of 0.850 g/cc to 0.890 g/cc, and wherein the density of the first ethylene-α-olefin block copolymer is equal to or greater than the density of the second ethylene-α-olefin block copolymer. In a second step (210), the multilayer cast film is then optionally stretched in at least one direction to a draw ratio of at least 1.9 to form a stretch-modified multilayer film. The optionally stretch-modified multilayer film is allowed to substantially relax in the at least one direction. In another embodiment, the film may be laminated in the stretched state. In a third step (215), the stretch-modified multilayer film is ultrasonically bonded to laminate the film to the non-woven to form a laminate.

In some embodiments, at least one of the surfaces of the stretch-modified multilayer film may optionally be treated by flame, plasma, or corona to improve properties, such as, adhesion or printability. Prior to lamination, an adhesive, for e.g., a hot melt adhesive, may be optionally applied either to the optionally stretch-modified multilayer film or substrate. Of course, as noted above, other lamination techniques may be used, which may include laminating the optionally stretch modified multilayer film via thermal bonding or ultrasonic bonding to another film or non-woven material. In an optional fourth step (220), the laminate may undergo a second stretch in at least one direction to a draw ratio of 3.6 or less. In some embodiments, the laminate does not undergo a second stretch. In embodiments where the laminate has undergone a second stretch, the laminate may be allowed to substantially relax in the at least one direction of the second stretch. The laminate may then be wound into a roll.

It should be understood herein that the process shown and described in the FIG. 4 is merely exemplary, and it would be obvious to those skilled in the art that various other changes and modifications can be made without departing from the spirit and scope of the invention. For example, each step may be performed continuously (i.e., in-line as shown), semi-continuously, or in separate unit operations. In some embodiments, an intermediate material may be produced that, in some examples, may be temporarily wound into a roll until it is ready further processing, at which point, the intermediate material is unwound and processed. The intermediate material may be produced after one or more process steps. The film is then laminated with non-woven layers on its opposing faces using a roll mill or using ultrasound energy. The manufacturing of intermittently bonded laminates using a textured roll is detailed in U.S. Pat. Nos. 5,156,793 and 7,955,457 to Buell et al., and Middlesworth et al., and U.S. Patent Publication Nos. 2006/0057924 and 2010/0215923 to Cheng et al., and to Frost respectively, the entire contents of which are hereby incorporated by reference.

As used in the foregoing context, an "intermittently" bonded laminate shall mean a laminate wherein the layers are bonded to one another at discrete spaced apart points or one wherein the layers are substantially unbonded to one another in discrete spaced apart areas. The points are determined by the pattern applied to the intermittently bonded laminates of the first type can be formed by passing two heat bondable layers through a heated patterned embossing roll nip or by applying discrete spaced apart areas of adhesive to one of the layers before bringing it in contact with the other ply, while an intermittently bonded web of the second type can be formed by feeding an adhesively coated apertured layer or scrim between a pair of substantially continuous layers. Conversely, a "substantially continuously" bonded laminate shall mean a laminate wherein prior to the application of tension the layers are initially bonded substantially continuously to one another throughout their areas of interface. Substantially continuously bonded laminate webs can be formed by extruding a first substantially continuous, thermoplastic adhesive layer directly onto a second layer while the first layer is in a heated condition, passing two heat bondable layers between a heated smooth surfaced roll nip or by applying a substantially continuous adhesive coating, spray or densely patterned melt blown to one of the layers prior to bringing it in contact with the other layer.

In an exemplary embodiment, the laminate is produced by using ultrasonic bonding to intermittently bond the non-woven and films. Ultrasonic welding is an industrial technique whereby high-frequency ultrasonic acoustic vibrations are locally applied to workpieces being held together under pressure to create a solid-state weld. The layers of the multilayer laminate are sandwiched between a fixed shaped nest (anvil) and a sonotrode (horn) connected to a transducer, and a low-amplitude acoustic vibration is emitted. Frequencies used in ultrasonic welding are 15 to 70 kHz, preferably 20 to 30 kHz.

When welding polymers, the interface of the two parts is specially designed to concentrate the melting process. The ultrasonic energy melts the point contact between the layers, creating a joint. This process is a good automated alternative to using glue or to using embossed roll mills. Ultrasonic welding of thermoplastics causes local melting of the plastic due to absorption of vibration energy. The vibrations are introduced across the portion of the multilayer laminate to be bonded.

The use of at least two polyethylene containing layers in the multilayered laminate provides the laminate with better haptics (feel and touch) than multilayered laminates that contain polypropylene. The multilayer laminates disclosed herein may be used to produce articles such as garments and other structures made from the articles, e.g., diaper backsheets and elastic tabs, hospital wear, etc., cross-linked articles, articles containing fillers and the like.

Test Methods

Unless otherwise stated, the following test methods are used. All test methods are current as of the filing date of this disclosure.

Density

The samples are prepared according to ASTM D1928. Measurements are made using ASTM D792, Method B.

Melt Index

Melt index, or $I_2$, is determined according to ASTM D1238 at 190° C., 2.16 kg.

Strain at Break and Stress at Break

Tensile specimens (prepared according to ASTM D638) were die cut from compression molded films. The specimen width is taken as 4.8 mm. The gauge length is taken as 22.25 mm. The strain and stress at break was measured with an INSTRON™ 5565 instrument equipped with a 100 N load cell and pneumatic grips under ambient conditions. The specimens were stretched at a constant speed of 500%/min (or about 111.25 mm/min) until sample failure. Five specimens were measured for each prepared film to determine the average and standard deviation of the strain at break and the stress at break.

First and Second Cycle Retraction & Extension Force

Three specimens were tested for each film at the maximum applied strain of 200%. The extension stress and retraction stress at strain levels of 50% were recorded for the first and second load and unload cycles.

The films were measured in the cross direction orientation with an INSTRON™ 5565 instrument equipped with a 100 N load cell and pneumatic grips under ambient conditions. Four 1 inch×5 inch specimens were cut from blown films and each sample was placed in the tensile tester jaws with a 1 inch gauge length. The specimens were initially stretched to achieve a pre-force load of 0.05 N at a speed of 50 mm/min. The specimens were then elongated to an applied strain of 200% at a constant speed of 250 mm/min, then held at a 200% strain for 30 seconds. The specimens were then unloaded to 0% strain at the same speed (250 mm/min) and then held for 60 seconds. The specimens were then re-stretched to an applied strain of 200% at the same speed (250 mm/min), held for 30 seconds, and unloaded back to 0% strain at the same speed (250 mm/min), thus completing two load and unload cycles. At least three trials were tested for each maximum applied strain. The average extension force at strain levels of 50% were recorded for the first and second load cycles. The average retraction force at strain levels of 50% were recorded for the first and second unload cycles. Three specimens were tested for each film at the maximum applied strain of 200%. The extension stress and retraction stress at strain levels of 50% were recorded for the first and second load and unload cycles.

Abrasion Test

"Abrasion resistance" is determined as follows. The film/non-woven laminate is abraded using a Sutherland 2000 Rub Tester to determine the fuzz level. A lower fuzz level is desired which means the laminate has a higher abrasion resistance. An 11.0 cm×4.0 cm piece of nonwoven or nonwoven laminate is abraded with sandpaper according to ISO POR 01 106 (a cloth sandpaper aluminum oxide 320-grit is affixed to a 2 lb. weight, and rubbed for 20 cycles at a rate of 42 cycles per minute) so that loose fibers are accumulated on the top of the laminate. The loose fibers were collected using tape and measured gravimetrically. The fuzz level is then determined as the total weight of loose fiber in grams divided by the laminate specimen surface area (44.0 cm$^2$).

EXAMPLES

Example 1

This example was conducted to demonstrate the manufacturing of the film 104 as well as the performance of these elastic films in multilayer laminates. The film has a core layer 104, two inner layers 104B and two outer layers 104C (See FIG. 1B). One of the outer layers comprises a slip masterbatch while the other has a slip masterbatch and an anti-block masterbatch. The ethylene/α-olefin block copolymer used in each of the layers is INFUSE™ 9007. Details are provided in Table 1. A single film described in the Table 1 (Sample #1).

TABLE 1

|  | Sample #1 |
| --- | --- |
| Target Melt Index (INFUSE ® 9007) | 1.5 |
| Outer layer 104C (first skin layer) | 36.5%* INFUSE 9007 + 13.5% Developmental olefin block copolymer (DOBC1) resin + 50% anti-block MB** |
| Inner Layer 104B | 73% INFUSE 9007 + 27% DOBC1 resin |
| Core Layer 104A | 73% INFUSE 9007 + 27% DOBC1 resin |
| Inner Layer 104B | 73% INFUSE 9007 + 27% DOBC1 resin |
| Outer layer 104C (Second Skin Layer) | 33.6% INFUSE 9007 + 12.4% DOBC1 resin + 50% anti-block MB + 4% slip MB |
| Film Thickness (micrometers) | 2.5 |

%*= All percentages are weight percents;
MB**= masterbatch

Table 2A shows the properties for the DOCBI resin.

TABLE 2A

| Property | Unit | Value |
| --- | --- | --- |
| Density (g/cc) | g/cc | 0.8671 |
| I$_2$, 190° C. | g/10 min | 30.1 |
| I$_{10}$, 190° C. | g/10 min | 241 |
| I$_{10}$/I$_2$ | Ratio | 8.0 |
| Mw | g/mol | 57870 |
| Mn | g/mol | 27300 |
| Mw/Mn | Ratio | 2.12 |
| Tc by DSC (crystallization temperature) | ° C. | 103.0 |
| Tm by DSC (melting temperature) | ° C. | 118.3 |
| Tg by DSC (glass transition temperature) | ° C. | −64.4 |
| ΔHm by DSC (heat of fusion) | J/g | 25.8 |
| % Cryst by DSC | wt % | 8.9 |
| Total C8 by NMR | mol % | 16.03 |
| Soft Seg. C8 by NMR | mol % | 19 |
| Hard Seg. C8 by NMR | mol % | 0.92 |
| % Soft Seg by NMR | wt % | 87 |
| % Hard Seg by NMR | wt % | 13 |
| Zn by XRF (zinc content as measured by Xray fluorescence) | ppm | 260 |
| Shore A Hardness (5 sec) | Shore A | 60 |

The details of the respective masterbatches used in the compositions of the Table 1 are provided in the Table 2B below.

TABLE 2B

| Anti block Masterbatch (MB) | 45 wt % INFUSE ™ 9817 + 5 wt % AMPLIFY ™ EA 103 + 50 wt % nepheline syenite supplied by Ampacet (LR-208120) |
| --- | --- |
| Slip Masterbatch (MB) | 95 wt % INFUSE 9530 + 5 wt % Eracumide. (Ampacet Masterbatch - LR-208126) |
| DOBC1 | MI (melt index) = 30, Density = 0.867 |

Each layer in the multilayer laminate of the Table 1 has a thickness of 0.5 micrometers for a total laminate thickness of 2.5 micrometers. The film sample of the Table 1 were then activated or "stretch modified" by stretching them in the cross direction.

As used herein, "stretch-modified" refers to films that undergo at least a first stretch in at least one direction after film formation and prior to subsequent processing steps, such as, lamination or bonding with a substrate or another film. In some embodiments, the films may undergo at least a first stretch in at least one direction to a draw ratio of at least 1.9 to form a stretch-modified film. In other embodiments, the films may undergo at least a first stretch in at least one direction to a draw ratio of at least 3.6 to form a stretch-modified film. In further embodiments, the films may undergo at least a first stretch in at least one direction to a draw ratio of at least 4.5 to form a stretch-modified film. In even further embodiments, films may undergo at least a first stretch in at least one direction to a draw ratio of at least 5.7 to form a stretch-modified film. In even further embodiments, films may undergo at least a first stretch in at least one direction to a draw ratio of at least 6.5 to form a stretch-modified film.

The draw ratio may be determined as described in U.S. Pat. No. 4,116,892 (the '892 patent), and is calculated by the following equation provided in FIG. 3 of '892 patent:

$$\text{Draw Ratio}\left(\frac{l}{w}\right) = \int_0^\pi \frac{1}{\pi}\sqrt{1 + a^2 \cos^2 x}\,dx,$$

where l=length of the sinus wave (as shown in FIG. 3 of the '892 patent), a=πd/w, d=groove depth, and w=distance between discs (as shown in FIG. 3 of the '892 patent). The Actual Draw Rate (ADR) is calculated by the following equation:

$$ADR = \frac{(\text{Draw Ratio} - 1)\,V}{4\frac{d}{w}\sqrt{\frac{R}{d} - \frac{1}{4}}},$$

where d=groove depth, w=distance between discs (as shown in FIG. 3 of the '892 patent), l=length of the sinus wave (as shown in FIG. 3 of the '892 patent), V is the velocity of the film entering the nip of the Stretch modification was conducted in a cross-direction stretching machine available from Biax-Fiberfilm Corporation (Neenah, Wis., USA). The Biax cross-direction stretching machine is described in U.S. Pat. No. 4,368,565 and the cross-direction draw ratio is calculated as described above. The width (w) or distance between the discs (center-to-center) as illustrated in FIG. 3 of the '892 patent was set at 0.135 in. The groove depth (d) or depth of engagement of the interdigitating disc was set to 0.26 in order to achieve a draw ratio (l/w) of 4.5.

Following activation, the films were laminated to either polypropylene (PP) monocomponent spunbond non-wovens or (PP/PE) bicomponent spunbond non-wovens. The bicomponent non-wovens have a polypropylene core with a polyethylene sheath in a 70/30 ratio. The polypropylene used in both non-wovens was a homopolymer polypropylene 5D49 formerly produced by the Dow Chemical Company and the polyethylene used in the bicomponent non-woven was ASPUN 6835 by the Dow Chemical Company. The nonwovens were produced at the non-wovens institute at NC State University in Raleigh, N.C. The basis weight of the non-wovens was 18 gsm and was processed at 0.60 grams/hole/minute (GHM). Both non-wovens were thermally bonded via a calendaring process with an embossing top roll temperature of 286° F. and a smooth bottom roll temperature of 280° F. at a calendar line speed of 230 ft/min and a calendar pressure of 500 psi.

The lamination occurred via ultrasonic bonding to the non-wovens at Hermann Ultrasonics in Bartlett, Ill. These multilayer laminates had a symmetric structure ABA, where A is the non-woven and B film and comprises the olefin block copolymer based film.

The film of the above example was bonded at different forces to find the bonding window of the film to the non-woven. The force was varied by adjusting the step position on the equipment. Step position adjusts the gap between the sonotrode and the anvil. The step position value is inversely proportional to the gap and is directly proportional to the resulting force that the laminate experiences during the bonding process. A higher step position results in a higher bonding force. Underbonded laminates are described as those that did not show embossing due to the bonding pattern of the anvil when the laminates were examined by optical microscopy, optimally bonded are described as the step-position where the laminate was substantially free of holes at the ultrasonic bond site, and overbonded are described as the step position whereby a majority of the bond sites exhibit holes. The anvil pattern used is a Dome 90 degree Pattern (P/N 500.008 supplied by Herrmann Ultrasonics. The pattern is described as a low profile, high distribution pattern having a 2.1% bonding area, 200 mm max bonding width, and 0.6 mm bonding height. All films laminates were produced at 10 ft/min line speed.

The nomenclature used for the various samples is shown in the Table 3. The nomenclature and its details are shown in the Table 3 and are used in the FIGS. 5 and 6.

TABLE 3

| Trials (PP) | Force - Steposition | Comments | Trials (PE/PP) | Force - Steposition | Comments |
|---|---|---|---|---|---|
| Film 7 7-PP-CD-8 | 7850 | Optimal bond | Film 7 7-PP/PE-CD-11 | 8000 | Overbond |
| Film 7 7-PP-CD-9 | 8000 | Over bond | Film 7 7-PP/PE-CD-12 | 7850 | Under bond |
| Film 7 7-PP-CD-10 | 7800 | Under bond | Film 7 7-PP/PE-CD-13 | 7900 | Optimal bonding |

After bonding the laminates, they were again passed through the ring rolling equipment at Biax fiberfilm and stretched in the CD direction in order to activate the extensible but non-elastic non-woven to allow the elastic laminates stretch. These film/non-woven laminates are referred to as 'activated' laminates. The films were stretched according to the same conditions described above but at a depth of engagement of 0.13 resulting in a draw ratio of 2.24.

Figure 5:
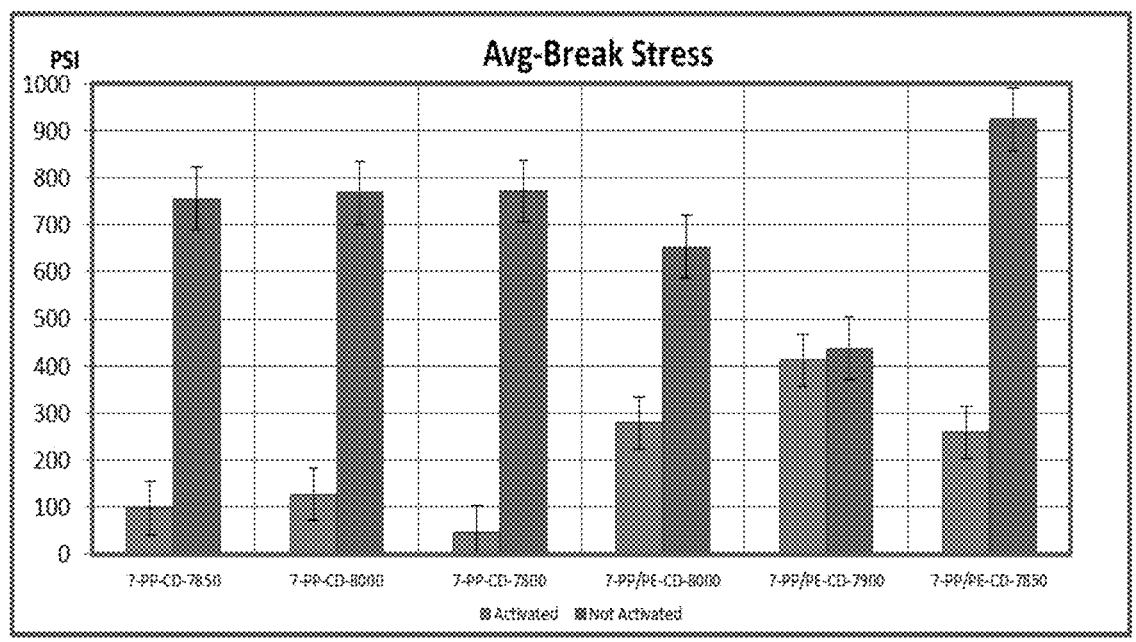
FIG. 5 is a graph showing the results of the tensile test. It clearly demonstrates that the stretching has a negative effect on the films bonded with monocomponent PP vs those with a bi-component non-woven PP/PE. This effect is apparent after the laminates have been stretched to simulate "in-use" performance.
Figure 6:
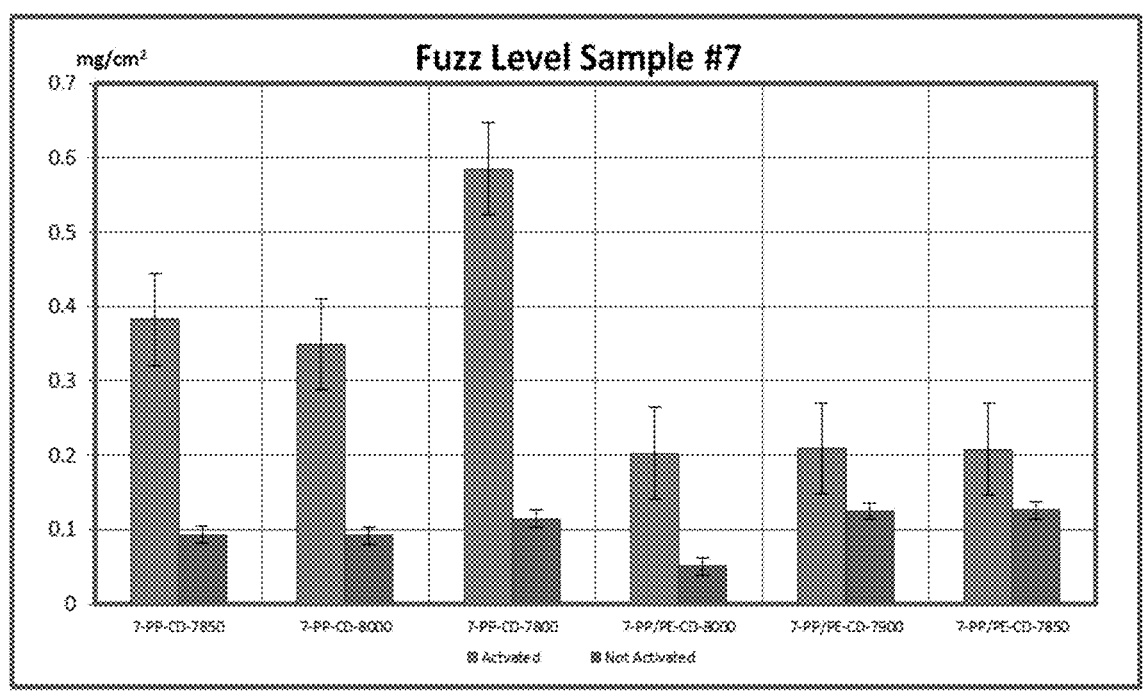
FIG. 6 is a graph showing the results of the abrasion test.

The FIG. 5 shows the results of the tensile test. It clearly demonstrates that the activation has a negative effect on the films bonded with monocomponent polypropylene vs those with a bicomponent non-woven polypropylene/polyethylene. This effect is apparent after the films have been activated. Activation decreases the average stress at break for both polypropylene as well as polypropylene/polyethylene non-woven based elastic laminates. The decrease in the average stress at break in the polypropylene based laminates are significantly greater than decrease in the average stress at break for the polypropylene/polyethylene based laminates and the resulting tensile strength of the activated bicomponent laminates is significantly higher than that of the active PP mono laminates The FIG. 6 displays the results of the abrasion test, which also shows that the fuzz level is significantly lower on the INFUSE™ laminates with non-wovens containing polyethylene than the ones that don't have polyethylene. This is surprising since polypropylene based non-wovens themselves typically have higher tensile strength and abrasion resistance than bicomponent polyethylene/polyropylene non-wovens.

What is claimed is:

1. A multilayer laminate comprising:
a film comprising a core layer and at least one outer layer, wherein the core layer and at the least one outer layer each comprises an ethylene-based elastomer; wherein the ethylene-based elastomer comprises ethylene and an α-olefin; wherein the ethylene-based elastomer comprises a majority mole fraction of ethylene;
a first non-woven layer in contact with a first surface of the film; and
a second non-woven layer in contact with a second surface of the film;

wherein the second surface of the film is oppposedly disposed to the first surface of the film;

wherein at least one of the first non-woven layer or the second non-woven layer comprises a non-woven web; and wherein the non-woven web is formed from a bicomponent fiber having a first component comprising a polyethylene-based polymer and a second component comprising a polymer having a melting point that is higher than the polyethylene-based polymer, wherein at least a portion of a surface of the bicomponent fiber comprises the first component;

wherein the film and at least one of the first non-woven layer or the second non-woven layer are joined at a plurality of ultrasonic bond sites.

2. The multilayer laminate of claim 1, wherein the film further comprises at least one inner layer, wherein the at least one inner layer is disposed between the core layer and the at least one outer layer.

3. The multilayer laminate of claim 2, wherein the at least one inner layer comprises a third an ethylene-based elastomer.

4. The multilayer laminate of claim 3, wherein at least one of the first ethylene-based elastomer present in the core layer, the second ethylene-based elastomer present in the outer layer, or the third ethylene-based elastomer present in the inner layer is different.

5. The multilayer laminate of claim 1, wherein the first ethylene-based elastomer and the second ethylene-based elastomer are different from one another.

6. The multilayer laminate of claim 1, wherein the second non-woven layer is different from the first non-woven layer.

7. The multilayer laminate of claim 1, wherein the plurality of ultrasonic bond sites comprise a very few holes less than 20% of holes.

8. The multilayer laminate of claim 1, where the laminate upon stretching retains greater than 25% of its average stress at break prior to stretching.

9. The multilayer laminate of claim 1, where the first non-woven layer, the second non-woven layer or both have multiple non-woven layers.

10. An article comprising the multilayer laminate of claim 1.

11. A method for manufacturing a multilayer laminate, the method comprising:

intermittently bonding together at a plurality of bond sites a film, a first non-woven layer and a second non-woven layer using ultrasonic energy to form a multilayer laminate;

wherein the first non-woven layer is in contact with a first surface of the film and the second non-woven layer is in contact with a second surface of the film;

wherein the second surface of the film is oppposedly disposed to the first surface of the film;

wherein the film comprises a core layer and at least one outer layer, wherein the core layer and the at least one outer layer each comprises an ethylene-based elastomer; wherein the ethylene-based elastomer comprises ethylene and an α-olefin; wherein the ethylene-based elastomer comprises a majority mole fraction of ethylene;

wherein at least one of the first non-woven layer or the second non-woven layer comprises a non-woven web;

wherein the non-woven web is formed from a bicomponent fiber having a first component comprising a polyethylene-based polymer and a second component comprising a polymer having a melting point that is higher than the polyethylene-based polymer, wherein at least a portion of a surface of the bicomponent fiber comprises the first component.

* * * * *